United States Patent
Bates et al.

(10) Patent No.: US 8,037,416 B2
(45) Date of Patent: Oct. 11, 2011

(54) PRESENTING AND FILTERING OBJECTS IN A VIRTUAL WORLD

(75) Inventors: Cary L Bates, Rochester, MN (US); Jim Chun-Ta Chen, Rochester, MN (US); Zachary A Garbow, Rochester, MN (US); Gregory E Young, South St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 12/186,623

(22) Filed: Aug. 6, 2008

(65) Prior Publication Data

US 2010/0037152 A1  Feb. 11, 2010

(51) Int. Cl.
*G06F 3/00* (2006.01)
*G06F 3/048* (2006.01)

(52) U.S. Cl. .......... 715/757; 715/758; 715/745

(58) Field of Classification Search .......... 715/757, 715/758, 706, 745
See application file for complete search history.

(56) References Cited

U.S. PATENT DOCUMENTS

| 2003/0156134 A1* | 8/2003 | Kim | 345/753 |
| 2009/0055484 A1* | 2/2009 | Vuong et al. | 345/619 |

* cited by examiner

*Primary Examiner* — Weilun Lo
*Assistant Examiner* — Truc Chuong
(74) *Attorney, Agent, or Firm* — Patterson & Sheridan, LLP

(57) ABSTRACT

Embodiments of the invention provide techniques for filtering and presenting elements of an immersive virtual environment. The elements may be filtered according to importance to the user, based on user-specified importance of each element, the number and type of past interactions with the elements, and the like. Further, the filtering may be performed on the basis of the user's preference for density of element presentation. The user may then be presented with a view of the virtual world in which elements having a higher degree of interest to the user are highlighted visually, and in which elements having a lesser degree of interest to the user are made partially transparent or invisible.

21 Claims, 7 Drawing Sheets

| ELEMENTS 560 | IMPORTANCE 562 |
|---|---|
| AVATAR A | 8.3 |
| AVATAR B | 2.5 |
| ALL KIOSKS | 4.0 |
| ACTIVITY: RUNNING | 5.0 |
| GROUP: FRIENDS | 7.6 |
| KEYWORD: FOOTBALL | 8.7 |

FIG. 5B

| SITUATION 520 | AVATAR DENSITY 522 | OBJECT DENSITY 524 |
|---|---|---|
| SOCIAL | HIGH | LOW |
| SHOPPING | LOW | HIGH |
| WORK | UNFILTERED | UNFILTERED |
| PUBLIC AREAS | LOW | MEDIUM |
| SPORTING EVENTS | HIGH | HIGH |

FIG. 5A

PRESENTING AND FILTERING OBJECTS IN A VIRTUAL WORLD

BACKGROUND OF THE INVENTION

1. Field of the Invention

Embodiments of the invention relate to immersive virtual environments. More specifically, embodiments of the invention relate to presenting and filtering objects within an immersive virtual environment.

2. Description of the Related Art

A virtual world is a simulated environment which users may inhabit and in which the users may interact with virtual objects and locations of the virtual world. Users may also interact with one another via avatars. An avatar generally provides a graphical representation of an individual within the virtual world environment. Avatars are usually presented to other users as two or three-dimensional graphical representations of humanoids. Frequently, virtual worlds allow for multiple users to enter and interact with one another. Virtual worlds provide an immersive environment as they typically appear similar to the real world, with real world rules such as gravity, topography, locomotion, real-time actions, and communication. Communication may be in the form of text messages sent between avatars, real-time voice communication, gestures displayed by avatars, symbols visible in the virtual world, and the like.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plots and events continue to occur as users enter (and exit) the virtual world.

SUMMARY OF THE INVENTION

One embodiment of the invention provides a computer-implemented method, comprising: receiving an indication of a requirement to present a plurality of elements to a user of a virtual world, wherein the user is represented by an avatar in the virtual world; determining, for the plurality of elements, respective degrees of importance to the user; determining a density of elements to be presented to the user; determining, based on the respective degrees of importance and the density of elements, one or more display characteristics for each element, wherein the one or more display characteristics indicate the degree of importance of each element to the user; and presenting the plurality of elements to the user, wherein each element is presented according to its respective one or more display characteristics.

Another embodiment of the invention provides a computer readable storage medium containing a program which, when executed, performs an operation. The operation comprises: receiving an indication of a requirement to present a plurality of elements to a user of a virtual world, wherein the user is represented by an avatar in the virtual world; determining, for the plurality of elements, respective degrees of importance to the user; determining a density of elements to be presented to the user; determining, based on the respective degrees of importance and the density of elements, one or more display characteristics for each element, wherein the one or more display characteristics indicate the degree of importance of each element to the user; and presenting the plurality of elements to the user, wherein each element is presented according to its respective one or more display characteristics.

Yet another embodiment of the invention includes a system, comprising: a processor; and a memory containing a program. When executed by the processor, the program is configured to: receiving an indication of a requirement to present a plurality of elements to a user of a virtual world, wherein the user is represented by an avatar in the virtual world; determining, for the plurality of elements, respective degrees of importance to the user; determining a density of elements to be presented to the user; determining, based on the respective degrees of importance and the density of elements, one or more display characteristics for each element, wherein the one or more display characteristics indicate the degree of importance of each element to the user; and presenting the plurality of elements to the user, wherein each element is presented according to its respective one or more display characteristics.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 5A-5B illustrate data structures configured for use in filtering and presenting elements of a virtual world, according to one embodiment of the invention.

DETAILED DESCRIPTION OF THE PREFERRED EMBODIMENTS

Figure 1:
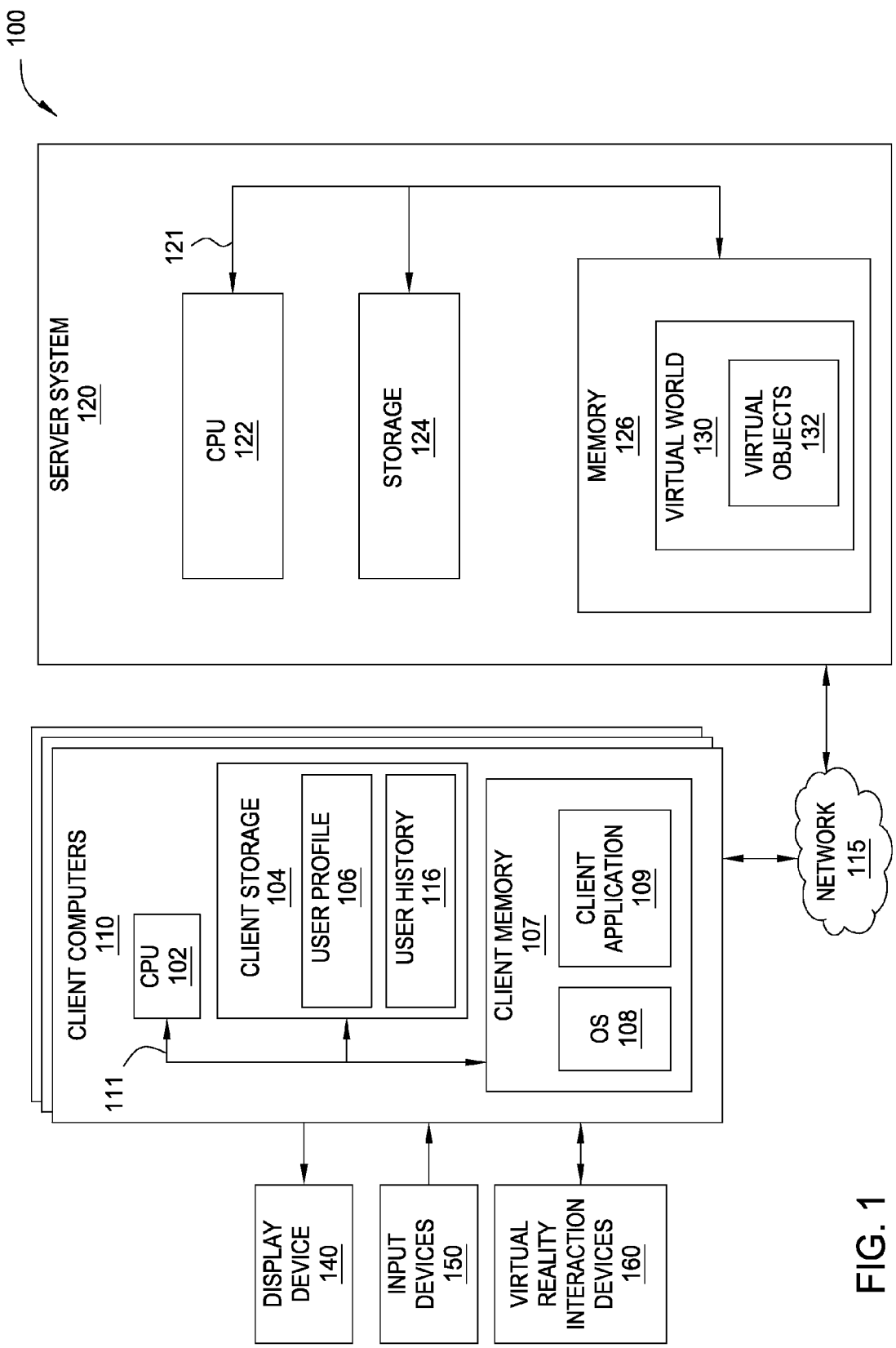
FIG. 1 is a block diagram that illustrates a client server view of computing environment, according to one embodiment of the invention.

A virtual world is a simulated environment in which users may be represented by avatars. An avatar may be used to "travel" through locations of the virtual world, such as virtual streets, buildings, rooms, etc. While in a given location, an avatar may also be used to interact with virtual elements (i.e., objects or other avatars) present therein. For example, an avatar may be able to approach another avatar, and may interact with the other avatar by communicating, performing a financial transactions, and the like. Thus, multiple users, although in different physical locations, may be present in the same virtual location, and may interact therein by using their respective avatars.

However, in a virtual world including a large number of elements, a user may have difficulty identifying particular elements which are of interest to the user. For example, when present in an area that includes a large number of avatars, the user may have trouble distinguishing a particular avatar which the user wishes to interact with. In another example, if the user enters a virtual store to search for a particular item for purchase, the user may have difficulty in picking out the desired item from a large number of virtual objects.

Embodiments of the invention provide techniques for filtering and presenting elements of an immersive virtual environment. The elements may be filtered according to importance to the user, based on user-specified importance of each element, the number and type of past interactions with the elements, and the like. Further, the filtering may be performed on the basis of the user's preference for density of element presentation. The user may then be presented with a view of the virtual world in which elements having a higher degree of interest to the user are highlighted visually, and in which elements having a lesser degree of interest to the user are made partially transparent or invisible.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, server system 120 includes a CPU 122, which obtains instructions and data via a bus 121 from memory 126 and server storage 124. The CPU 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). Server storage 124 may represent hard-disk drives, flash memory devices, optical media and the like. In addition, memory 126 and storage 124 may be considered to include memory physically located elsewhere in a server 120, for example, on another computer coupled to the server 120 via bus 121. Server 120 may be operably connected to the network 115, which generally represents any kind of data communications network. Accordingly, the network 115 may represent both local and wide area networks, including the Internet.

Memory 126 includes a virtual world 130. In one embodiment, the virtual world 130 may be a software application that allows a user to explore and interact with an immersive virtual environment. Illustratively, virtual world 130 includes elements 132. The elements 132 may be virtual representations of objects, avatars, locations, structures, and the like.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. As shown, client storage 104 includes user profile 106 and user history 116, which are described further below. Client storage 104 may represent hard-disk drives, flash memory devices, optical media and the like. Client computer 110 is operably connected to the network 115.

Client memory 107 includes an operating system (OS) 108 and a client application 109. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, the client application 109 provides a software program that allows a user to connect to the virtual world 130, and once connected, to perform various user actions. Such actions may include exploring virtual locations, interacting with other avatars, and interacting with virtual objects. Further, the client application 109 may be configured to generate and display a visual representation of the user within the immersive environment, generally referred to as an avatar. The avatar of the user is generally visible to other users in the virtual world, and the user may view avatars representing the other users. Such avatars may be considered to be elements 132 included in the virtual world 130.

The client application 109 may also be configured to generate and display the immersive environment to the user and to transmit the user's desired actions to the virtual world 130. The client application 109 may present a display of the user's current viewport, meaning the limited portion of the virtual world 130 visible from a given virtual location. The viewport may represent a "first-person" point of view, meaning the view of the virtual world as seen through the eyes of an avatar representing the user. Alternatively, the viewport may represent a "third-person" point of view, meaning the view of the virtual world as seen from a point outside the avatar representing the user. Generally, if the viewport represents a third-person point of view, it will include the avatar representing the user within the viewport.

In one embodiment, the user may view the virtual world using a display device 140, such as an LCD or CRT monitor display, and interact with the client application 109 using input devices 150. Further, the user may interact with the client application 109 and the virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within the virtual world 130.

Figure 2A:
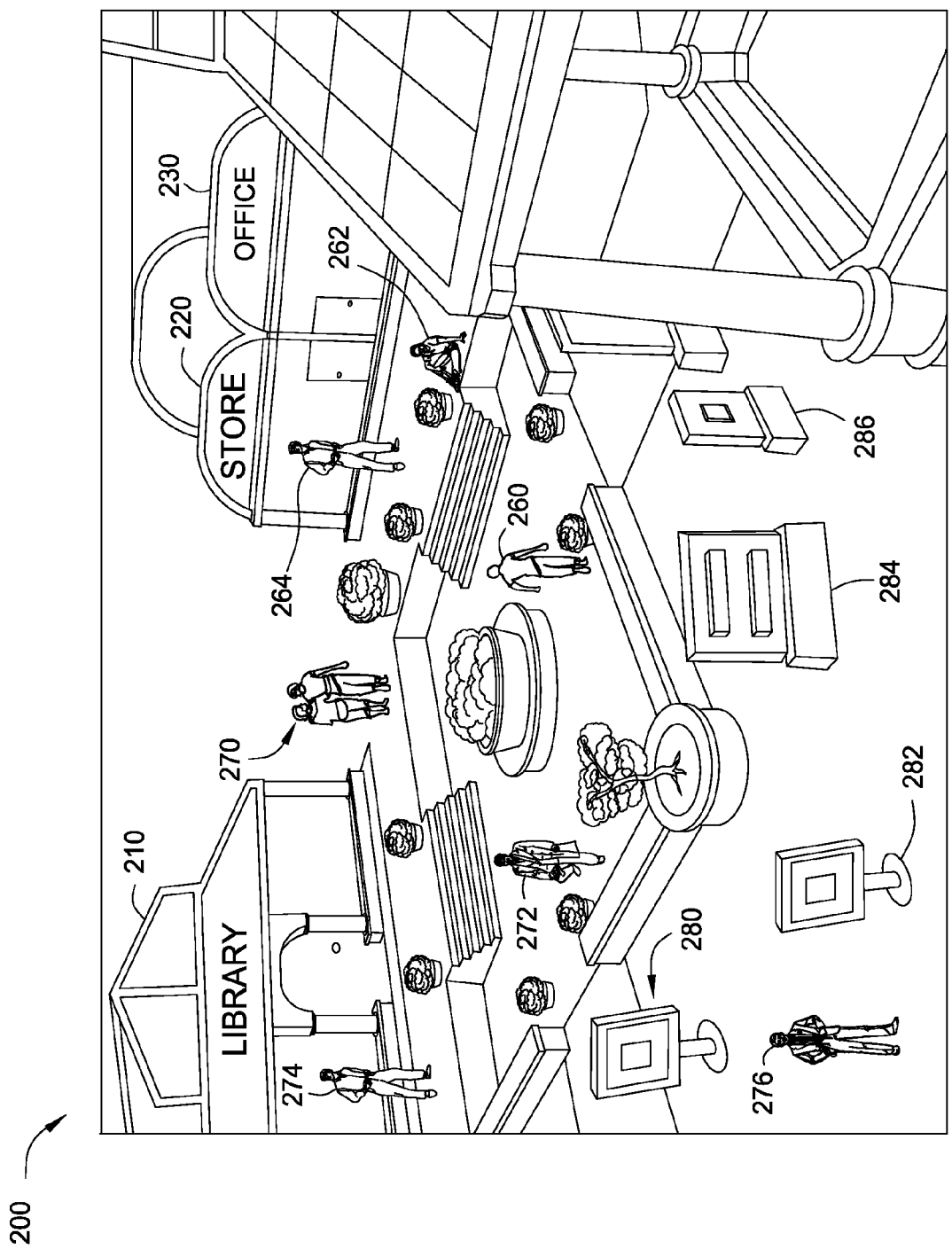
FIGS. 2A-2C illustrate exemplary user displays for a user participating in a virtual world, according to one embodiment of the invention.

By way of example, FIG. 2A illustrates a user display 200 for a user participating in a virtual world, according to one embodiment of the invention. In this case, assume that the user display 200 is a first-person viewport, meaning the view seen through the eyes of the avatar representing the user. The user display 200 includes the elements 132 of the virtual world 130 that are within the user's current viewport. In this example, the user display 200 is a view of a virtual town square, including buildings (e.g., store 220, office 230, library 210, etc.), avatars (e.g., avatar 260, avatar 262, etc.) which represent other users of the virtual world 130, and interactive kiosks (e.g., kiosk 280, kiosk 282, etc.). The user may interact with the elements 132 displayed in user display 200. For example, the current user may initiate a contact with the avatar 260, thus enabling the current user to engage in conversation with a user represented by the avatar 260. In another example, the user may interact with the kiosk 280 by operating controls built into the kiosk 280, requesting information, etc. The user may also enter the store 220 or the office 230.

In some situations, the user display 200 may include a large number of elements 132, which may cause the user to have difficulty in identifying elements 132 which are of particular interest to the user. For example, in the situation illustrated in FIG. 2A, assume that the user is searching for avatar 260. However, because of the other avatars present in the user display 200, the user may not be able to quickly pick out avatar 260. Thus, the user may fail to contact avatar 260 before it passes out of the user's viewport. In another example, if the user goes into the store 220 to search for a particular item, he may have difficulty in picking out the desired item from a large number of virtual objects on display within the store 220.

In one embodiment, the client application 109 may be configured to filter the elements 132 within a user's viewport according to their importance to the user. More specifically, the client application 109 may determine the user's current viewport, and then determine the elements 132 that are included in the user's viewport. The client application 109 may then determine a degree of importance for each element 132 included in the user's viewport. For example, referring to FIG. 2A, the client application 109 may determine the degree of importance of each element 132 included in the user display 200, such as the avatar 260, kiosk 280, store 200, library 210, office 230, and the like.

In one embodiment, the client application 109 may be configured to present the elements 132 within a user display according to their importance to the user. More specifically, the display characteristics of the elements 132 may be determined such that important elements are emphasized to the user. For example, elements 132 that are determined to be important may be presented within the user display 200 with bold lines or with a highlight effect. Further, the display characteristics of the elements 132 may be determined such that less important elements 132 are de-emphasized to the user. For example, particular elements 132 that are determined to be less important may be presented within the user display 200 as being semi-transparent elements, or may not be presented at all (i.e., by "hiding" them).

Figure 2B:
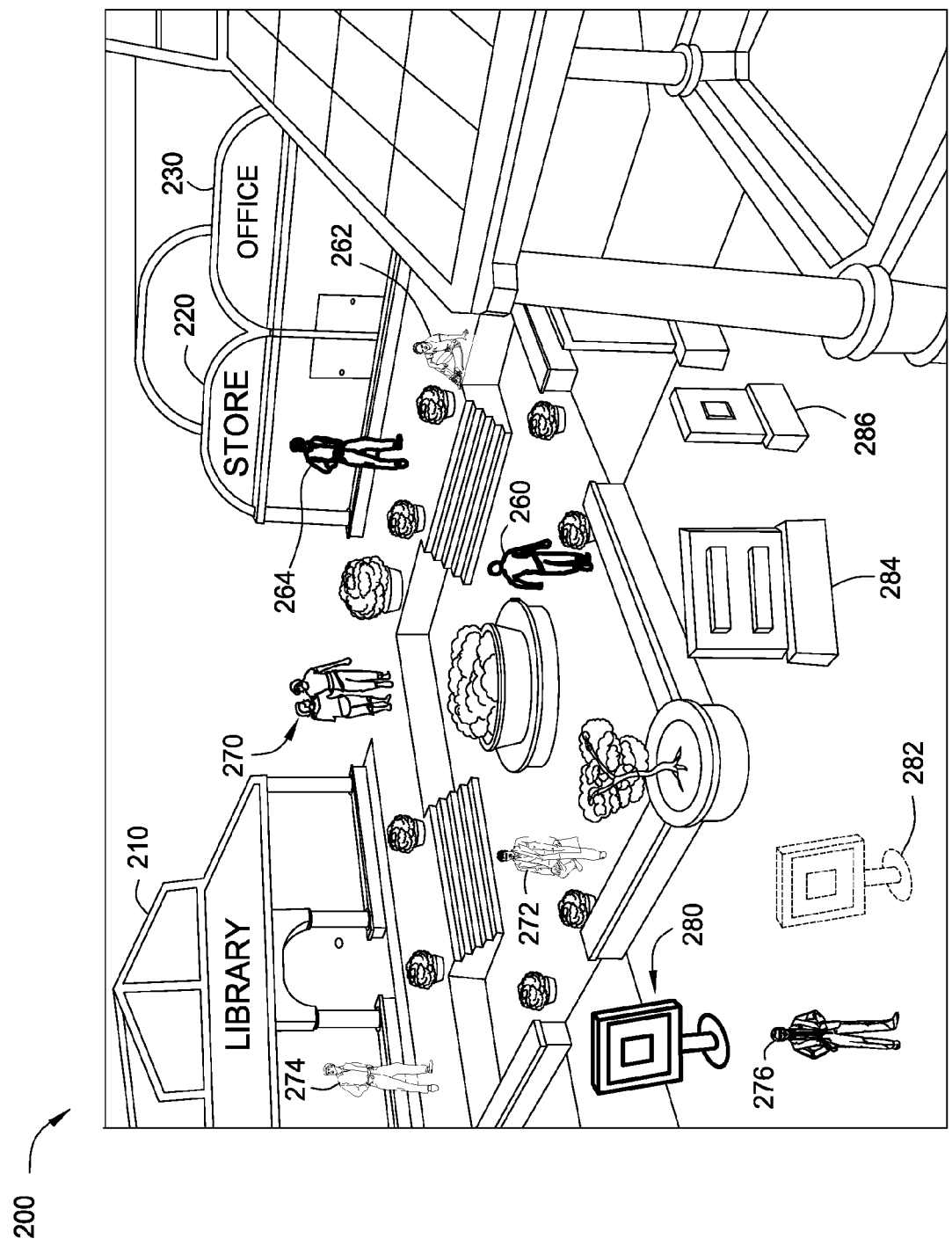

FIG. 2B illustrates the user display 200 as presenting the elements 132 according to their importance to the user, according to one embodiment of the invention. Assume that the client application 109 has determined that avatar 260, avatar 264 and kiosks 280 are of relatively high importance to the user. Accordingly, these important elements 132 are presented within the user display 200 with a darker line, thus being more likely to draw the user's attention. Further, assume that the client application 109 has determined that avatar 262, avatar 272, avatar 274 and kiosk 282 are of relatively low importance to the user. Accordingly, these less-important elements are presented within the user display 200 as being semi-transparent, thus being less likely to draw the user's attention. Finally, assume that the client application 109 has determined that the remaining elements in the viewport are of normal (i.e., average) importance to the user.

Accordingly, those elements are presented within the user display 200 in a normal manner (i.e., in a default graphical style).

Figure 2C:
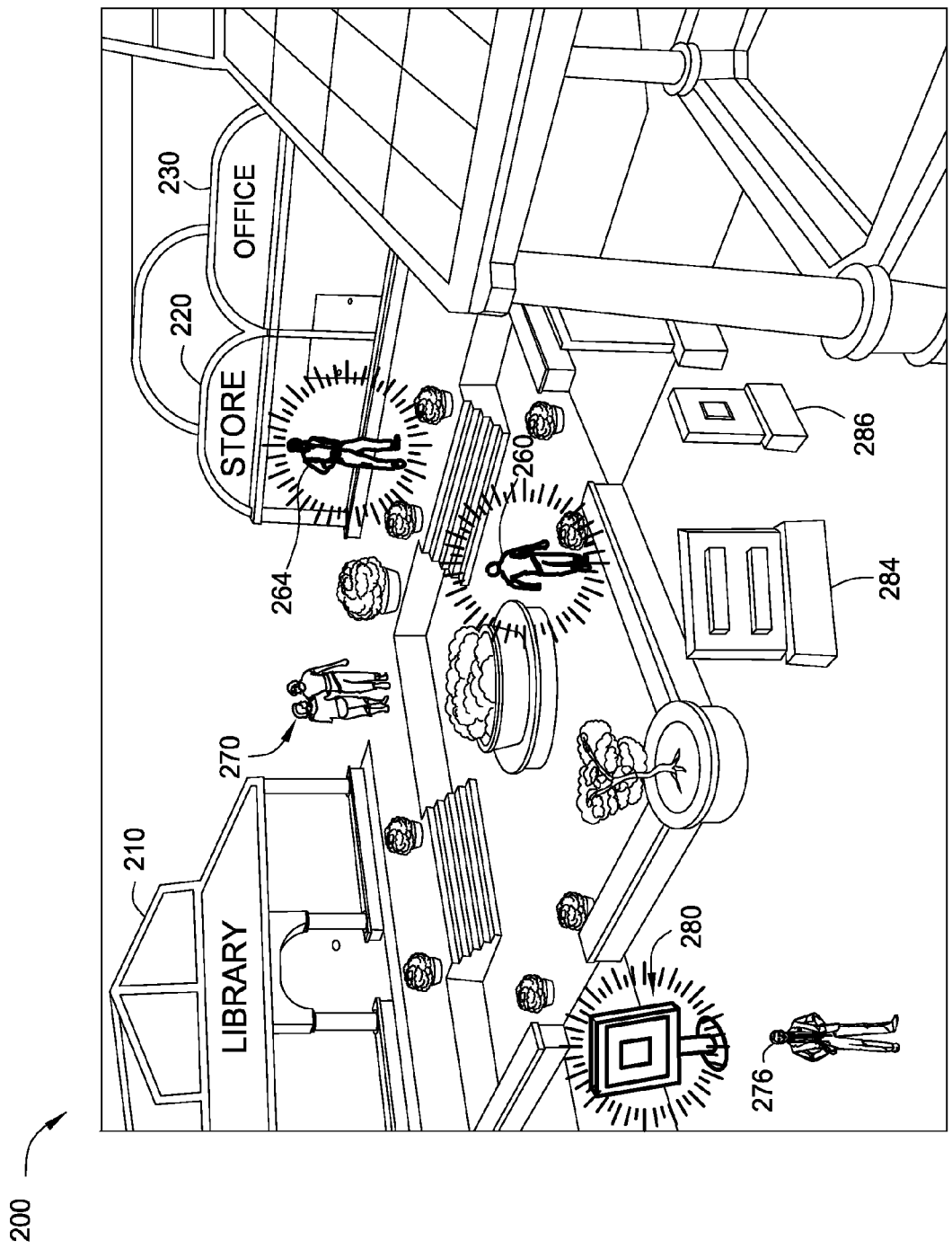

FIG. 2C illustrates another example of the user display 200 presenting the elements 132 according to their importance to the user. Assume that the client application 109 has determined the importance of the elements 132 in the same manner described above with reference to FIG. 2B. However, in this example, the elements determined to be of relatively high importance to the user (e.g., avatar 260) are presented within the user display 200 with a highlight effect. Further, the elements 132 determined to be of relatively low importance to the user (e.g., avatar 262) are hidden, meaning that they are not presented within the user display 200 at all.

Of course, the examples shown in FIGS. 2B-2C are provided for illustrative purposes, and are not intended to be limiting of the invention. Other techniques for presenting elements 132 according to their importance to the user may be used. For example, important elements may be shown with indicators such as text labels, colors, lighting effects, icons, and the like. In another example, the size of the elements 132 may vary, with important elements being presented in a larger scale than unimportant elements. In yet another example, the importance of elements 132 presented within the user display 200 may be communicated by non-visual indicators (e.g., auditory indicators associated to each element 132). These and other embodiments are contemplated, and are thus considered to be within the scope of the invention.

In one embodiment, the presentation of the elements 132 may also be based on user preferences for element densities. That is, the presentation of the elements 132 within the user display 200 may be performed according to user preference data describing the number of element 132 to be displayed in specific situations. Such user preference data may be specified, e.g., in the user profile 106 included in the client storage 104. For example, assume the user profile 106 includes user preference data specifying that, when the user is present in a public area of the virtual world 130, the user wishes to view a maximum of ten avatars at a time. Assume further that the user is a public space which includes more than ten avatars. In such a case, the user display 200 may only present the user with the ten avatars determined (e.g., by the client application 109) to be most important to the user. The remaining avatars in the user's viewport may not be shown in the user display 200, or may be presented as partially transparent avatars.

FIG. 5A illustrates exemplary user preference data 510 for element densities, according to one embodiment of the invention. As shown, user preference data 510 may be composed in the form of a table, and may include a "SITUATION" column 520 storing identifiers for defined situations that the user may encounter while participating in the virtual world 130. For example, the "SITUATION" column 520 includes, at row 531, the identifier "SOCIAL," corresponding to a social situation (e.g., a virtual party). In another example, the "SITUATION" column 520 also includes, at row 532, the identifier "PUBLIC AREAS," corresponding to situations in which the user is present in a public space (e.g., a street). In yet another example, the "SITUATION" column 520 also includes, at row 533, the identifier "WORK," corresponding to a situation in which the user is present in a working area (e.g., an office), or in which the user has adopted a working profile (e.g., a defined mode of interacting with the virtual world 130).

As shown, the user preference data 510 may also include an "AVATAR DENSITY" column 522 storing values of the preferred densities of avatars in each identified situation, and an "OBJECT DENSITY" column 524 storing values of the preferred densities of objects (i.e., elements other than avatars) in each identified situation. For example, row 531 stores the avatar density value "HIGH," meaning that, in a social situation, the user prefers to view a relatively high number of the avatars included in his viewport. Further, row 531 also stores the object density value "LOW" for the situation "SOCIAL," meaning that the user prefers that, in a social situation, a relatively small number of the objects included in the viewport should be presented to the user. In one embodiment, the values "HIGH" and "LOW" may be converted to specific numerical values (or proportions) by use of, e.g., a user-configurable table or system settings (not shown). In another example, row 533 stores the avatar density value "UNFILTERED," and the object density value "UNFILTERED," meaning that, in a work situation, the user wishes to view all avatars and objects included in his viewport.

Note that the user preference data 510 is provided for the sake of illustration, and is not intended to limit the scope of the invention. Other embodiments of user preferences for element densities are also contemplated. For example, the user preferences may specify element densities in terms of absolute quantities (e.g., maximum of 10 elements, between 20 and 30 elements, etc.), on percentages (e.g., maximum of 20 percent of elements in viewport), and the like. Note that, as used herein, the term "density" is understood to refer to the elements 132 included anywhere in the user display 200. That is, the density of elements 132 is determined for the user display 200 as a whole, without regard for uniformity or clustering in the spatial arrangement of the elements 132.

In one embodiment, the presentation of the elements 132 may also be based on maintaining the realism of the virtual world 130. More specifically, the client application 109 may be configured to determine display characteristics for elements 132 that will reduce (or eliminate) unrealistic situations. For example, assume that a user has specified the user preference data 510 shown in FIG. 5A, and that the user is currently present in a public area. Thus, since the user preference for avatar density in the current situation is "LOW," the user may be presented with few (if any) visible avatars. That is, even if other avatars are included in the user's viewport, they may be hidden from the user by the client application 109. However, in this situation, the hidden avatars may result in unrealistic situations, thus causing confusion for the user. For example, assume one of the hidden avatars is driving a car that is visible within the user's viewport. The client application 109 may determine that the user should not be presented with a moving car that does not appear to have a driver. Accordingly, the client application 109 may modify the display characteristics of the avatar such that the avatar is not hidden (e.g., the avatar is presented as partially transparent or opaque). Alternatively, the client application 109 may modify the display characteristics of the car to also be invisible, thus resolving the unrealistic situation.

In one embodiment, the client application 109 may be configured to change display characteristics in response to requests for interaction by other avatars. For example, assume that an avatar representing the user of the client application 109 is walking in a public area, and that the user has specified a preference for low avatar density (i.e., prefers to be presented with few visible avatars). Thus, the user is not presented with a second avatar (representing another user) located in the same public area. However, assume that the user's avatar is visible to the user of the second avatar. Assume further that, as the user's avatar passes near the second avatar, the second avatar initiates a conversation with the user's avatar. Since the second avatar is hidden from the user, the user may perceive the conversation as appearing to come out of thin air, thus causing confusion. In such situations, the client application 109 may be configured to alert the first user of the attempted communication. The user may be alerted by, e.g., a text or voice message, a warning sound, or an icon displayed within the user interface. Further, the client application 109 may enable the first user to accept the attempted communication, and then change the display characteristics of the hidden avatar to be visible.

In one embodiment, the client application 109 may be configured to perform physical interactions with an element 132 according to the display characteristics of the element 132. That is, any simulated physical contact or interaction with an element 132 of the virtual world 130 may be modeled by the client application 109, such that the resulting physical behavior reflects the visual appearance of the element 132. For example, elements 132 that are presented as being semi-transparent or hidden may have reduced (or no) physical effects upon the user's avatar. Assume that the user's avatar is walking in a public space. Assume also that several other avatars are present in the same public space, with some displayed to the user as solid avatars, other displayed to the user as semi-transparent avatars, and yet other avatars being hidden from the user. In the event that the user's avatar bumps into a solid avatar, the client application 109 may be configured to convey the physical contact by stopping the motion of the user's avatar. Further, in the event that the user's avatar bumps into a semi-transparent avatar, the client application 109 may be configured to convey the physical contact by slowing or deflecting the motion of the user's avatar. Furthermore, in the event that the user's avatar moves into a location occupied by a hidden avatar, the client application 109 may be configured to ignore the physical contact, thus allowing the user's avatar to pass unimpeded through the occupied location.

In some situations, a user may interact with the virtual world 130 as a part of a group of avatars. For example, the avatar representing the user may be traveling with a group of avatars representing the user's friends. However, the various group members may have different display characteristics for the elements 132 (e.g., other avatars or objects) that they may encounter within the virtual world 130. Such differences in display characteristics may lead to confusion among the group members. For example, in the case that two users have similar viewports (i.e., they are looking in the same direction), the two users may perceive a different number of elements 132 as being present in the same location.

In one embodiment, multiple client applications 109 may be configured to reconcile the display characteristics of elements 132 being presented to a group of users. That is, multiple client applications 109 (e.g., included in various client computers 110) may combine the individual display characteristics determined for each user, such that all users included in a defined group are presented with the same display characteristics for particular elements 132. For example, the multiple client applications 109 may be configured to select uniform display characteristics based on a majority rule (e.g., display any elements that are visible to a majority of users), based on a unanimous rule (e.g., display only those elements that are visible to all users), and the like. The user groups may be defined, for example, by the users themselves, or by an administrator of the virtual world 130.

Figure 3:
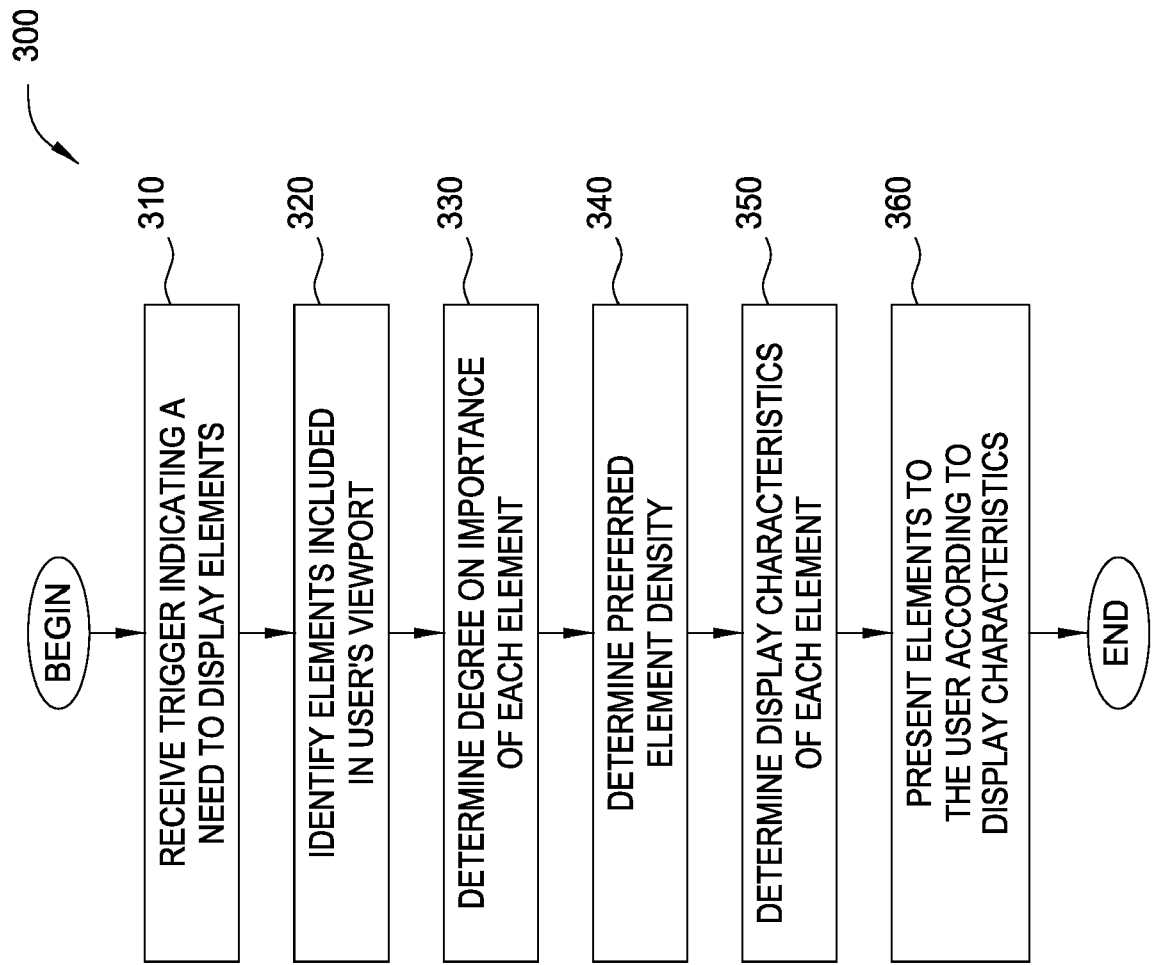
FIG. 3 is a flow diagram illustrating a method for filtering and presenting elements of a virtual world, according to one embodiment of the invention.

FIG. 3 is a flow diagram illustrating a method 300 for filtering and presenting elements of a virtual world, according to one embodiment of the invention. Persons skilled in the art will understand that, even though the method is described in conjunction with the system of FIG. 1, any system configured to perform the steps of the method 300, in any order, is within the scope of the present invention.

The method 300 begins at step 310, when a client application 109 receives a trigger indicating the need to display elements 132 of a virtual world 130 to a user. Such a trigger may include a user command (e.g., joystick or mouse input, keyboard command, menu selection, etc.) to navigate an avatar into a new location within the virtual world 130, a user command to change the avatar's viewport (e.g., look up/down, look left/right, etc.), another avatar (representing a different user) entering the user's viewport, and the like. The elements 132 may be displayed within the display device 140 (shown in FIG. 1).

At step 320, the client application 109 may determine the elements 132 that are included in the user's viewport. For example, the client application 109 may first determine the user's viewport based on where the avatar representing the user is located within the virtual world 130, and in which direction the avatar is looking. The client application 109 may then identify the elements 132 that are visible within the user's viewport. For example, referring to FIG. 2A, the client application 109 may identify the elements 132 visible within the user display 200, including avatar 260, avatar 262, kiosk 280, store 220, etc.

At step 330, the client application 109 may determine the degree of importance to the user of each element 132 included in the user's viewport. More specifically, the degree of importance of the elements 132 may be determined using criteria such as user preferences and past interactions. Such techniques for determining the degree of importance of elements are discussed in greater detail with reference to FIG. 4.

At step 340, the client application 109 may determine the preferred density of elements 132 to be presented to the user. In one embodiment, the preferred density of elements 132 may be determined based on preferences specified by the user. For example, the user profile 106 may include the user preference data 510 (shown in FIG. 5A) describing the user's preference for the presentation of elements 132 in particular situations.

At step 350, the display characteristics of the elements 132 may be determined based on their importance to the user (determined at step 330) and the user's preferred density of elements 132 (determined at step 340). More specifically, the client application 109 may determine the appearance of each element 132 within the user display 200. In one embodiment, the client application 109 may sort each element 132 according to their respective degrees of importance, and then categorize the sorted elements 132 according to the preferred density of elements 132. For example, the elements 132 may be categorized into two categories (e.g., high and low importance), three categories (e.g., high, medium, and low importance), and the like. Each category of elements 132 may then be assigned a particular set of display characteristics. Each set of display characteristics may be configured to communicate the respective degree of importance of the elements 132 included in a category. For example, a category of elements 132 having high importance to the user may be presented as having highlight effects, bold lines, brighter colors, lighting effects, text labels, icons, and the like. Conversely, a category of elements 132 having low importance to the user may be presented as semi-transparent elements, may be hidden from the user, or may be presented as having lighter-than-normal lines, duller colors, lighting effects, text labels, icons, and the like.

At step 360, the elements 132 may be presented to the user according to the display characteristics determined at step 350. For example, the user may be presented with the user display 200 illustrated in FIG. 2B, such that particular elements 132 are emphasized (or de-emphasized) based on their importance to the user and the user's preferred density of elements 132. After step 360, the method 300 terminates.

Figure 4:
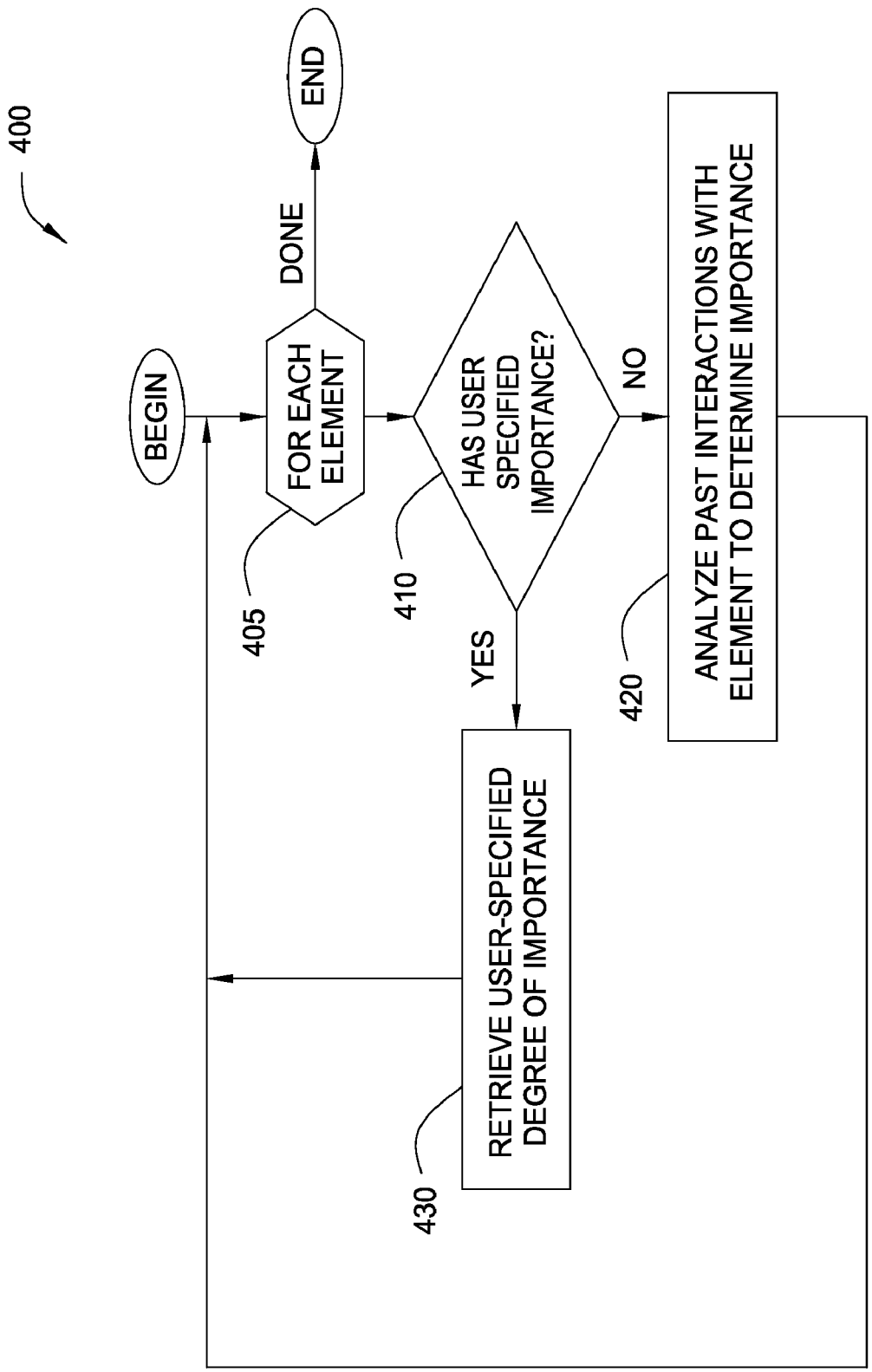
FIG. 4 is a flow diagram illustrating a method for determining the degree of importance of elements in a user's viewport, according to one embodiment of the invention.

FIG. 4 is a flow diagram illustrating a method 400 for determining the degree of importance of elements in a user's viewport, according to one embodiment of the invention. For the sake of illustration, method 400 is described in conjunction with the system of FIG. 1. However, persons skilled in the art will understand that any system configured to perform the steps of method 400, in any order, is within the scope of the present invention.

The method 400 represents one embodiment of the step 330 of the method 300 illustrated in FIG. 3. Thus, the method 400 may be performed by a client application 109 (shown in FIG. 1) to determine the degrees of importance of the elements 132 identified within a user's viewport.

The method 400 begins at step 405, where the method 400 enters a loop for processing each element 132 identified within a user's viewport. At step 410, it is determined whether the user has specified a degree of importance for the element 132. For example, the client application 109 may determine whether there is any predefined data describing the degree of importance that the user has assigned to the current element 132. If not, the method 400 continues at step 420, where the client application 109 may analyze the user's past interactions with the element 132. For example, if the user has had a large amount of interaction with the element 132 (e.g., several interactions, extensive or complex interactions, etc.), the client application 109 may determine that the element 132 has a relatively high degree of importance to the user. In contrast, if the user has had a small amount of interaction with the element 132 (e.g., few or no interactions, simple interactions, etc.), the client application 109 may determine that the element 132 has a relatively low degree of importance to the user. In one embodiment, such historical data describing past interactions may be stored in a data structure included in the client computer 110, for instance the user profile 106.

However, if it is determined at step 410 that the user has specified a degree of importance for the element 132, the method 400 continues at step 430, where the client application 109 may retrieve the user-specified degree of importance for the current element 132. For example, the client application 109 may retrieve predefined data describing the degree of importance of the element 132. Such data may be stored in an element table, as described below with reference to FIG. 5B. Once all elements 132 are completed at step 405 (i.e., degrees of importance are determined for all elements 132 identified within a user's viewport), the method 400 terminates. The method 400 may be performed to determine the relative degrees of importance of all elements 132 (i.e., all avatars and objects) included in the user's viewport. Alternatively, the method 400 may be performed in separate classes of elements 132, for example avatars, kiosks, buildings, etc. That is, the method 400 may be performed such that each element is ranked in importance only in comparison to other elements within the same class of elements.

FIG. 5B illustrates an element table 520 configured to store predefined data describing the degree of importance of elements 132, according to one embodiment of the invention. As shown, the element table 520 may include an "ELEMENTS" column 560 storing identifiers for specific elements (or groups of elements) that the user may encounter while participating in the virtual world 130. Further, the element table 520 may include an "IMPORTANCE" column 562 storing numerical values specified by the user to describe the importance of each element. In this example, the numerical values are measured on a scale of 0 to 10, with 0 indicating no importance, and 10 indicating highest importance.

Note that, in row 571, the user has assigned the element "AVATAR A" (e.g., an avatar used by a friend of the user) the importance value of 8.3, indicating that "AVATAR A" has a relatively high degree of importance to the user. In contrast, in row 572, the user has assigned element "AVATAR B" (e.g., an avatar used by a casual acquaintance of the user) the importance value of 2.5, indicating that "AVATAR B" has a relatively low degree of importance to the user. As shown, the user may also specify degrees of importance for specific objects or for groups of objects (e.g., "ALL KIOSKS" included in row 573). Further, the user may specify values for elements exhibiting a particular action or behavior. For example, in row 574, the identifier "ACTIVITY: RUNNING" corresponds to any avatars that are engaged in the activity of running. Furthermore, the user may also specify a degree of importance for a defined group of elements. For example, in row 575, the identifier "GROUP: FRIENDS" corresponds to a defined group of avatars representing friends of the user. Furthermore, the user may also specify degrees of importance for elements matching descriptive keywords. For example, in row 576, the identifier "KEYWORD: FOOTBALL" may be used to match to any elements 132 that are associated to the keyword "FOOTBALL" (e.g., a stadium). Such descriptive keywords may be stored in a data structure (e.g., XML metadata, database table, etc.) describing characteristics of each element 132.

Of course, the embodiments described above are intended to be illustrative, and are not limiting of the invention. Other embodiments are broadly contemplated. For example, the functionality of the client application 109 may be incorporated into the virtual world 130. That is, the virtual world 130 may be configured for presenting elements according to importance to the user. Further, the method 400 may be modified to include other techniques for determining the degree of importance of each element 132. In one embodiment, the degree of importance of an element 132 may be based on the value of the element 132. For example, elements 132 having a relatively high value (i.e., high cost in terms of real or virtual money) may be determined to have higher degrees of importance to the user than elements 132 having relatively low value. Similarly, the degree of importance of an element 132 may be based on other criteria, such as potential danger, proximity to the user, and the like.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
receiving an indication of a requirement to present a plurality of elements to a user of a virtual world, wherein the user is represented by an avatar in the virtual world, wherein the plurality of elements include avatars representative of other users and other display objects representative of physical objects;
determining, for the plurality of elements, respective degrees of importance to the user, wherein the respective degrees of importance to each of the plurality of elements are specified in a user profile of the user or the respective degrees of importance to each of the plurality of elements is determined based on past interactions of the user with the each of the plurality of elements;
determining a density of elements to be presented to the user;
determining, based on the respective degrees of importance and the density of elements, one or more display characteristics for each element, wherein the one or more display characteristics indicate the degree of importance of each element to the user, and wherein determining one or more display characteristics for each element comprises sorting the plurality of elements according to their respective degrees of importance; and presenting the sorted plurality of elements to the user, wherein each element is presented according to its respective one or more display characteristics.

2. The computer-implemented method of claim 1, wherein determining degrees of importance comprises retrieving predefined data describing a degree of importance assigned by the user to each element.

3. The computer-implemented method of claim 2, wherein the predefined data comprises degrees of importance assigned to one or more of: (i) an avatar identifier, (ii) an object identifier, (iii) a predefined group of avatars, (iv) a predefined group of objects, (v) elements exhibiting a particular behavior and (vi) elements associated to a descriptive keyword.

4. The computer-implemented method of claim 1, wherein determining degrees of importance comprises analyzing historical data describing the user's past interactions with the plurality of elements.

5. The computer-implemented method of claim 1, wherein the one or more display characteristics determined for elements having relatively high degrees of importance to the user comprise at least one of: (i) a highlight effect, (ii) a bold line style, (iii) a lighting effect, (iv) a text label, (v) an icon, and (vi) a color effect.

6. The computer-implemented method of claim 1, wherein the one or more display characteristics determined for elements having relatively low degrees of importance to the user comprise at least one of: (i) a transparency effect, (ii) a lighter-than-normal line style, (iii) a lighting effect, (iv) a text label, (v) an icon, and (vi) a color effect.

7. The computer-implemented method of claim 1, wherein determining the density of elements to be presented to the user comprises retrieving predefined data describing user preferences for densities of elements to be presented in a plurality of situations.

8. The computer-implemented method of claim 7, wherein the user preferences are specified in terms of one of: (i) a maximum quantity of elements, (ii) a range of quantities of elements, and (iii) a maximum percentage of elements.

9. The computer-implemented method of claim 1, wherein the plurality of elements comprise at least one of: (i) one or more avatars representing other users of the virtual world, and (ii) one or more objects included in the virtual world.

10. The computer-implemented method of claim 1, wherein determining one or more display characteristics for each element further comprises:

categorizing the sorted elements according to the density of elements; and determining one or more display characteristics for each category of sorted elements.

11. A computer-readable storage medium containing a program, which when executed on a processor performs an operation, the operation comprising:

receiving an indication of a requirement to present a plurality of elements to a user of a virtual world, wherein the user is represented by an avatar in the virtual world, wherein the plurality of elements include avatars representative of other users and other display objects representative of physical objects;

determining, for the plurality of elements, respective degrees of importance to the user, wherein the respective degrees of importance to each of the plurality of elements are specified in a user profile of the user or the respective degrees of importance to each of the plurality of elements is determined based on past interactions of the user with the each of the plurality of elements;

determining a density of elements to be presented to the user;

determining, based on the respective degrees of importance and the density of elements, one or more display characteristics for each element, wherein the one or more display characteristics indicate the degree of importance of each element to the user, and wherein determining one or more display characteristics for each element comprises sorting the plurality of elements according to their respective degrees of importance; and presenting the sorted plurality of elements to the user, wherein each element is presented according to its respective one or more display characteristics.

12. The computer-readable storage medium of claim 11, wherein determining degrees of importance comprises retrieving predefined data describing a degree of importance assigned by the user to each element.

13. The computer-readable storage medium of claim 12, wherein the predefined data comprises degrees of importance assigned to one or more of: (i) an avatar identifier, (ii) an object identifier, (iii) a predefined group of avatars, (iv) a predefined group of objects, (v) elements exhibiting a particular behavior and (vi) elements associated to a descriptive keyword.

14. The computer-readable storage medium of claim 11, wherein determining degrees of importance comprises analyzing historical data describing the user's past interactions with the plurality of elements.

15. The computer-readable storage medium of claim 11, wherein the one or more display characteristics determined for elements having relatively high degrees of importance to the user comprise at least one of: (i) a highlight effect, (ii) a bold line style, (iii) a lighting effect, (iv) a text label, (v) an icon, and (vi) a color effect.

16. The computer-readable storage medium of claim 11, wherein the one or more display characteristics determined for elements having relatively low degrees of importance to the user comprise at least one of: (i) a transparency effect, (ii) a lighter-than-normal line style, (iii) a lighting effect, (iv) a text label, (v) an icon, and (vi) a color effect.

17. The computer-readable storage medium of claim 11, wherein determining the density of elements to be presented to the user comprises retrieving predefined data describing user preferences for densities of elements to be presented in a plurality of situations.

18. The computer-readable storage medium of claim 17, wherein the user preferences are specified in terms of one of: (i) a maximum quantity of elements, (ii) a range of quantities of elements, and (iii) a maximum percentage of elements.

19. The computer-readable storage medium of claim 11, wherein the plurality of elements comprise at least one of: (i) one or more avatars representing other users of the virtual world, and (ii) one or more objects included in the virtual world.

20. The computer-readable storage medium of claim 11, wherein determining one or more display characteristics for each element further comprises:

categorizing the sorted elements according to the density of elements; and determining one or more display characteristics for each category of sorted elements.

21. A system, comprising:

a processor; and a memory containing a program, which when executed by the processor is configured to perform an operation, the operation comprising the steps of:

receiving an indication of a requirement to present a plurality of elements to a user of a virtual world, wherein the user is represented by an avatar in the virtual world, wherein the plurality of elements include avatars representative of other users and other display objects representative of physical objects;

determining, for the plurality of elements, respective degrees of importance to the user, wherein the respective degrees of importance to each of the plurality of elements are specified in a user profile of the user or the respective degrees of importance to each of the plurality of elements is determined based on past interactions of the user with the each of the plurality of elements;

determining a density of elements to be presented to the user;

determining, based on the respective degrees of importance and the density of elements, one or more display characteristics for each element, wherein the one or more display characteristics indicate the degree of importance of each element to the user, and wherein determining one or more display characteristics for each element comprises sorting the plurality of elements according to their respective degrees of importance; and presenting the sorted plurality of elements to the user, wherein each element is presented according to its respective one or more display characteristics.

* * * * *